(12) United States Patent
Biggers (10) Patent No.: US 7,770,387 B2
(45) Date of Patent: Aug. 10, 2010

(54) AUTOGENOUS SEAM WELD FOR A TORQUE CONVERTER AND METHOD FOR AUTOGENOUSLY WELDING A TORQUE CONVERTER

(75) Inventor: Paul Biggers, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 400 days.

(21) Appl. No.: 11/897,493

(22) Filed: Aug. 30, 2007

(65) Prior Publication Data

US 2008/0053772 A1    Mar. 6, 2008

Related U.S. Application Data (60) Provisional application No. 60/842,175, filed on Sep. 1, 2006.

(51) Int. Cl.
*B23K 26/20* (2006.01)
*F16H 41/24* (2006.01)

(52) U.S. Cl. ......................... 60/364; 29/889.5

(58) Field of Classification Search ............... 60/330, 60/664, 666; 29/889.5
See application file for complete search history.

(56) References Cited

U.S. PATENT DOCUMENTS

| | | | |
|---|---|---|---|
| 4,833,295 A * | 5/1989 | Locker et al. .......... 219/121.63 |
| 4,867,641 A | 9/1989 | Okuno et al. |
| 5,384,958 A * | 1/1995 | O'Daniel et al. ........... 29/889.5 |
| 5,388,678 A | 2/1995 | Murata |
| 5,431,325 A * | 7/1995 | Victoria .................... 29/889.5 |
| 6,953,112 B2 | 10/2005 | Miura |
| 7,032,729 B2 * | 4/2006 | Prater et al. ................... 60/366 |
| 7,040,469 B2 | 5/2006 | Shirataki et al. |
| 2004/0112699 A1 | 6/2004 | Prater et al. |
| 2007/0048082 A1 | 3/2007 | Hoffmann et al. |
| 2007/0224046 A1 | 9/2007 | Wang et al. |

FOREIGN PATENT DOCUMENTS

DE    19755168    6/1999

* cited by examiner

*Primary Examiner*—Thomas E Lazo
(74) *Attorney, Agent, or Firm*—Simpson & Simpson, PLLC (57) ABSTRACT

A method for welding components in a torque converter, including: overlapping first and second edge portions of first and second components in the torque converter, respectively; applying energy to the first portion; and melting, in the absence of filler material, at least a portion of the first portion to weld the first and second components. In some aspects, the converter includes a cover and pump and the first component is one of the cover and pump and the second component is the other of the cover and pump. The present invention also broadly comprises a torque converter, including first and second components with overlapping respective edge portions and an autogenous weld, formed from the first component edge portion and in the absence of a filler material, connecting the first and second components.

21 Claims, 9 Drawing Sheets

AUTOGENOUS SEAM WELD FOR A TORQUE CONVERTER AND METHOD FOR AUTOGENOUSLY WELDING A TORQUE CONVERTER

CROSS-REFERENCE TO RELATED APPLICATIONS

This application claims the benefit under 35 U.S.C. §19(e) of U.S. Provisional Application No. 60/842,175 filed Sep. 1, 2006.

FIELD OF THE INVENTION

The present invention relates to improvements in apparatus for transmitting force between a rotary driving unit (such as the engine of a motor vehicle) and a rotary driven unit (such as the variable-speed transmission in the motor vehicle). In particular, the invention relates to a method for autogenously welding components in a torque converter, in particular, a cover and a pump in the torque converter. The invention also relates to a torque converter with autogenously welded components, in particular, a cover and a pump.

BACKGROUND OF THE INVENTION

Figure 1:
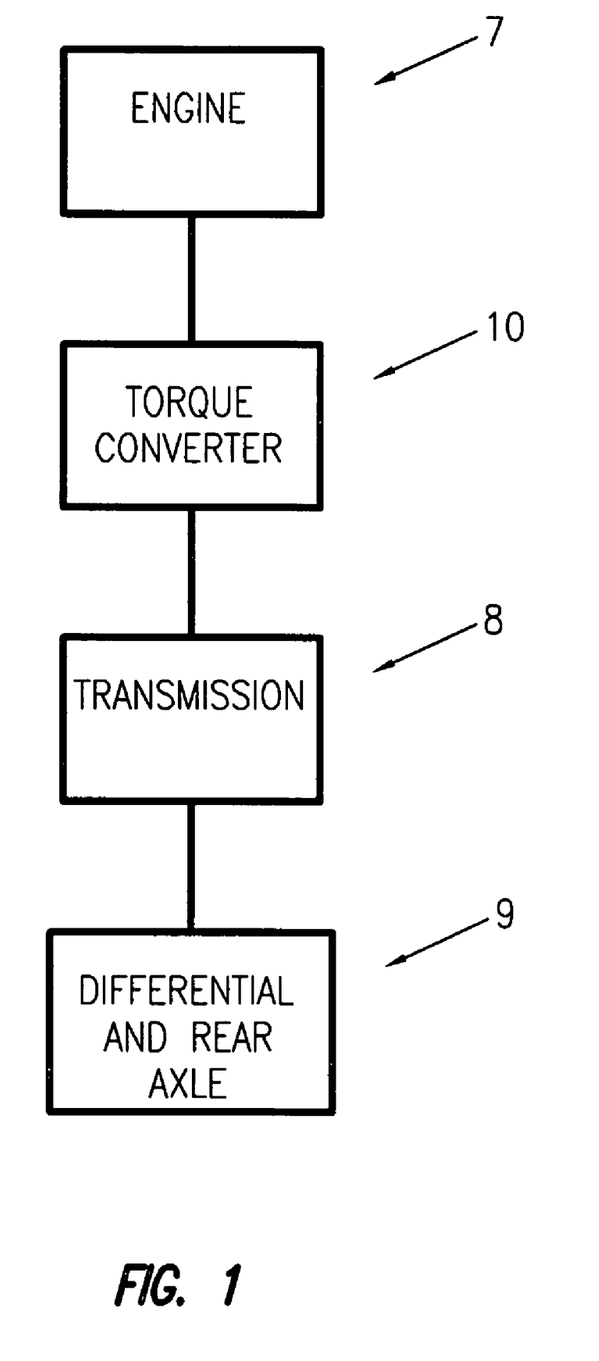
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
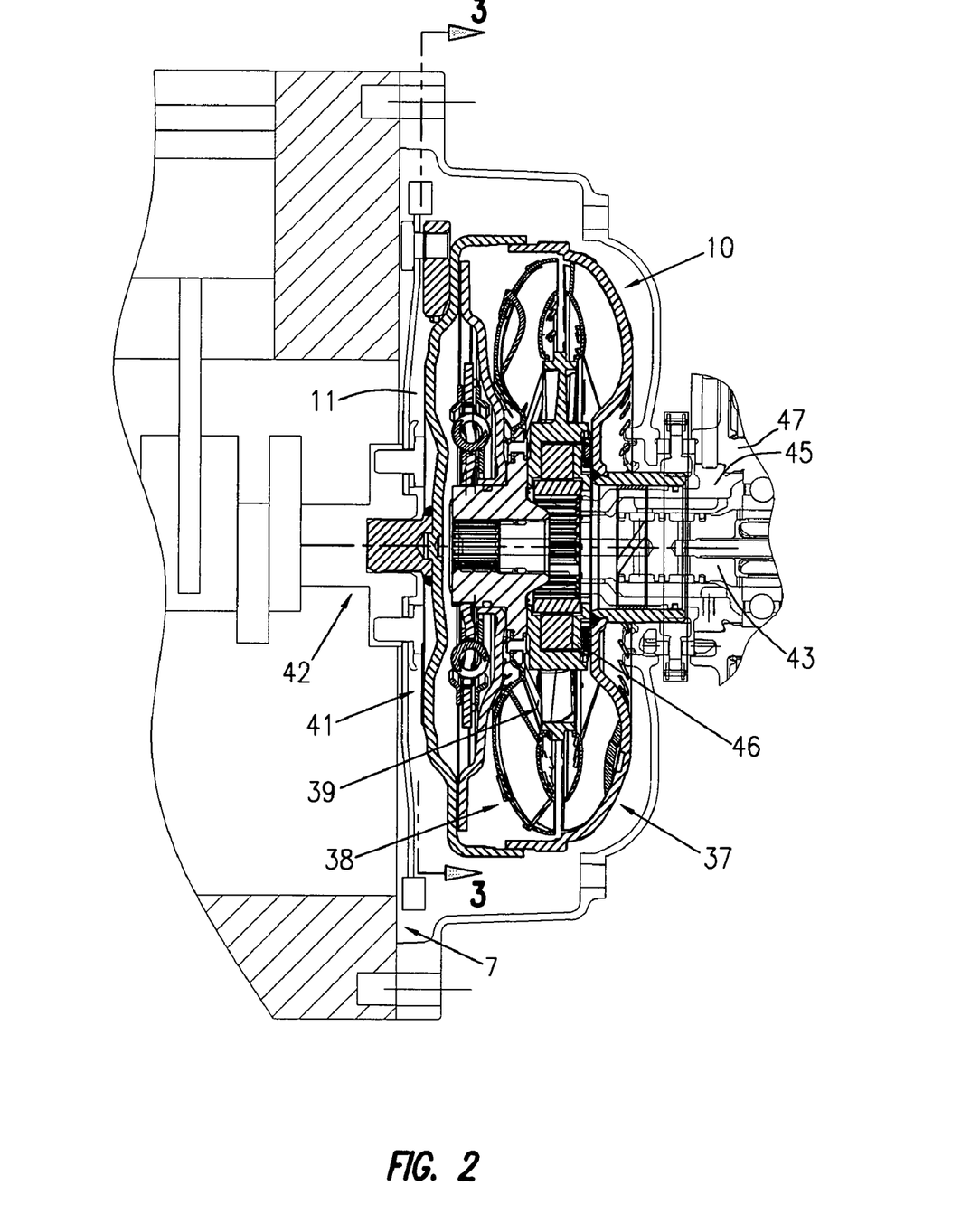
FIG. 2 is a cross-sectional view of a prior art torque converter, shown secured to an engine of a motor vehicle.
Figure 3:
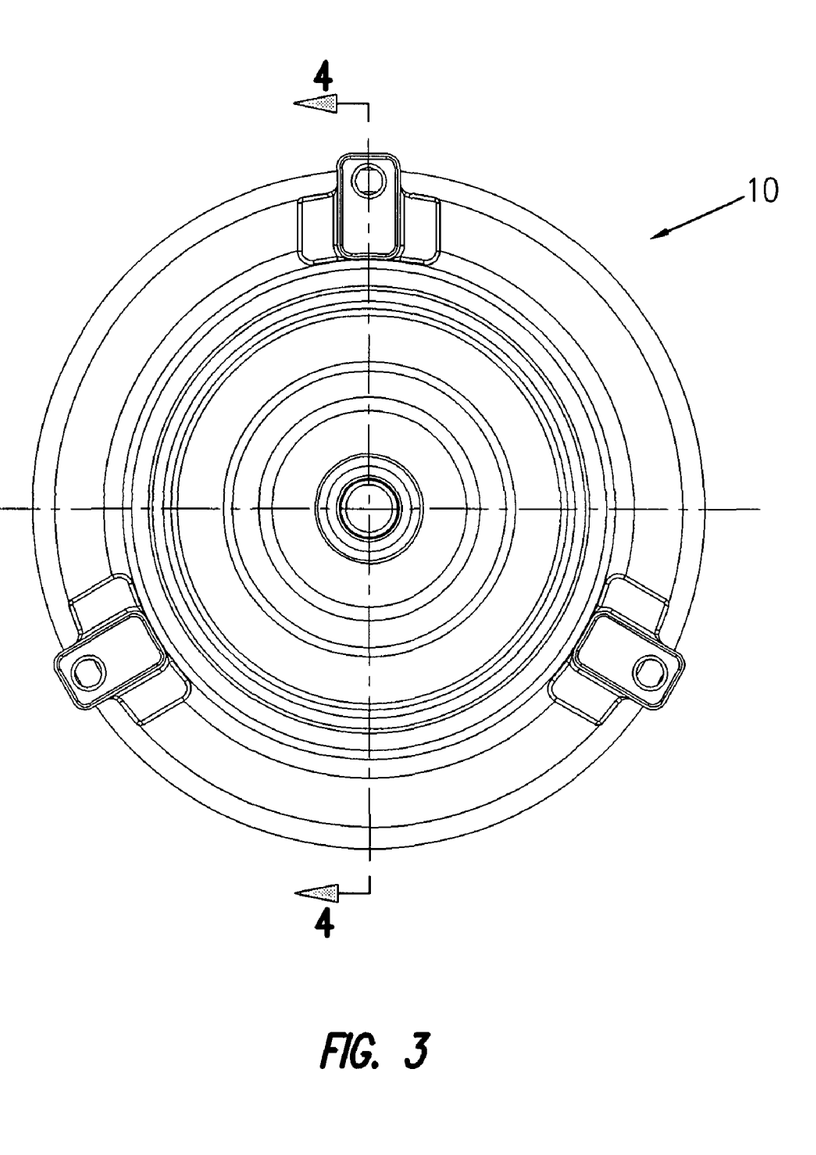
FIG. 3 is a left view of the torque converter shown in FIG. 2, taken generally along line 3-3 in FIG. 2.
Figure 4:
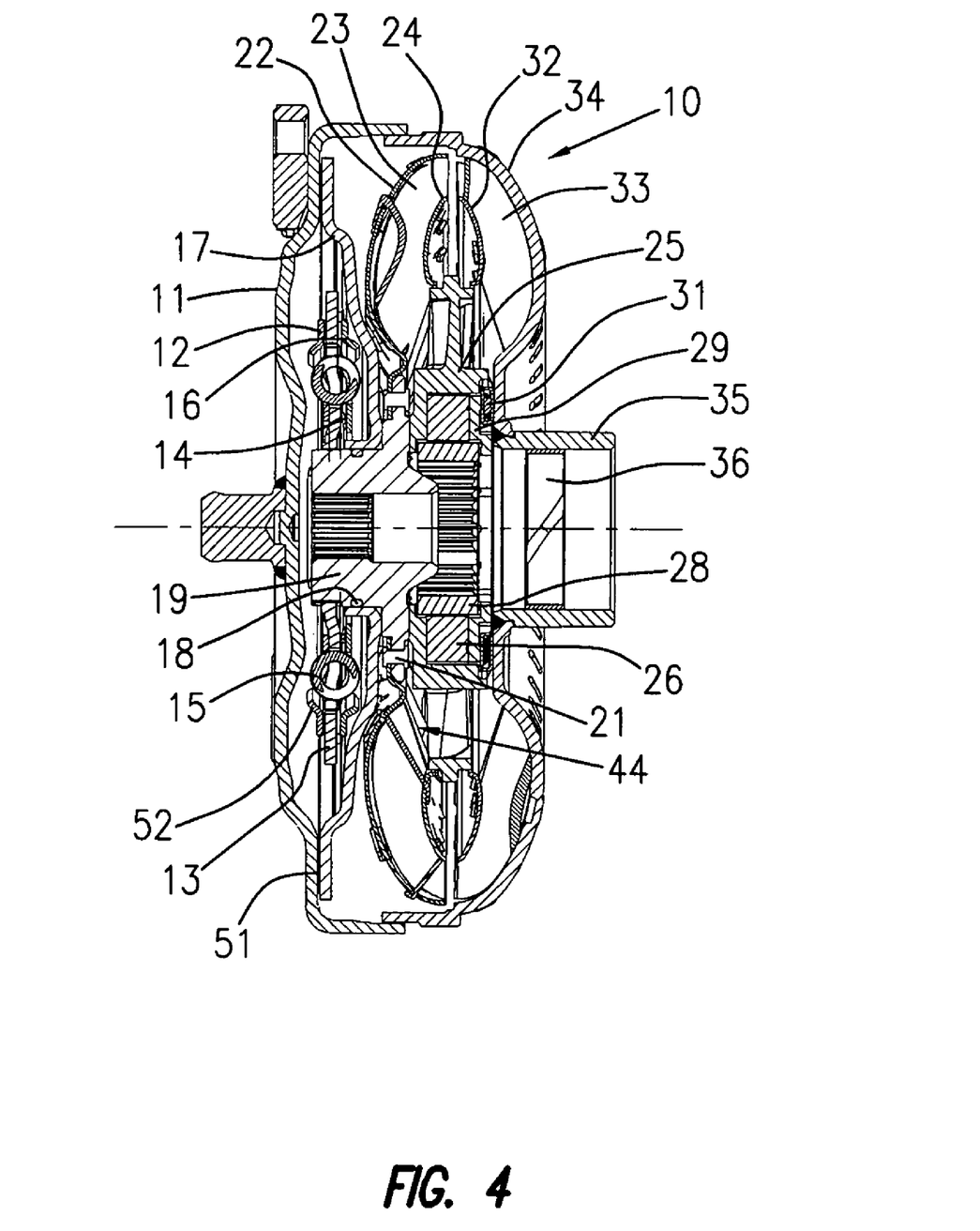
FIG. 4 is a cross-sectional view of the torque converter shown in FIGS. 2 and 3, taken generally along line 4-4 in FIG. 3.
Figure 5:
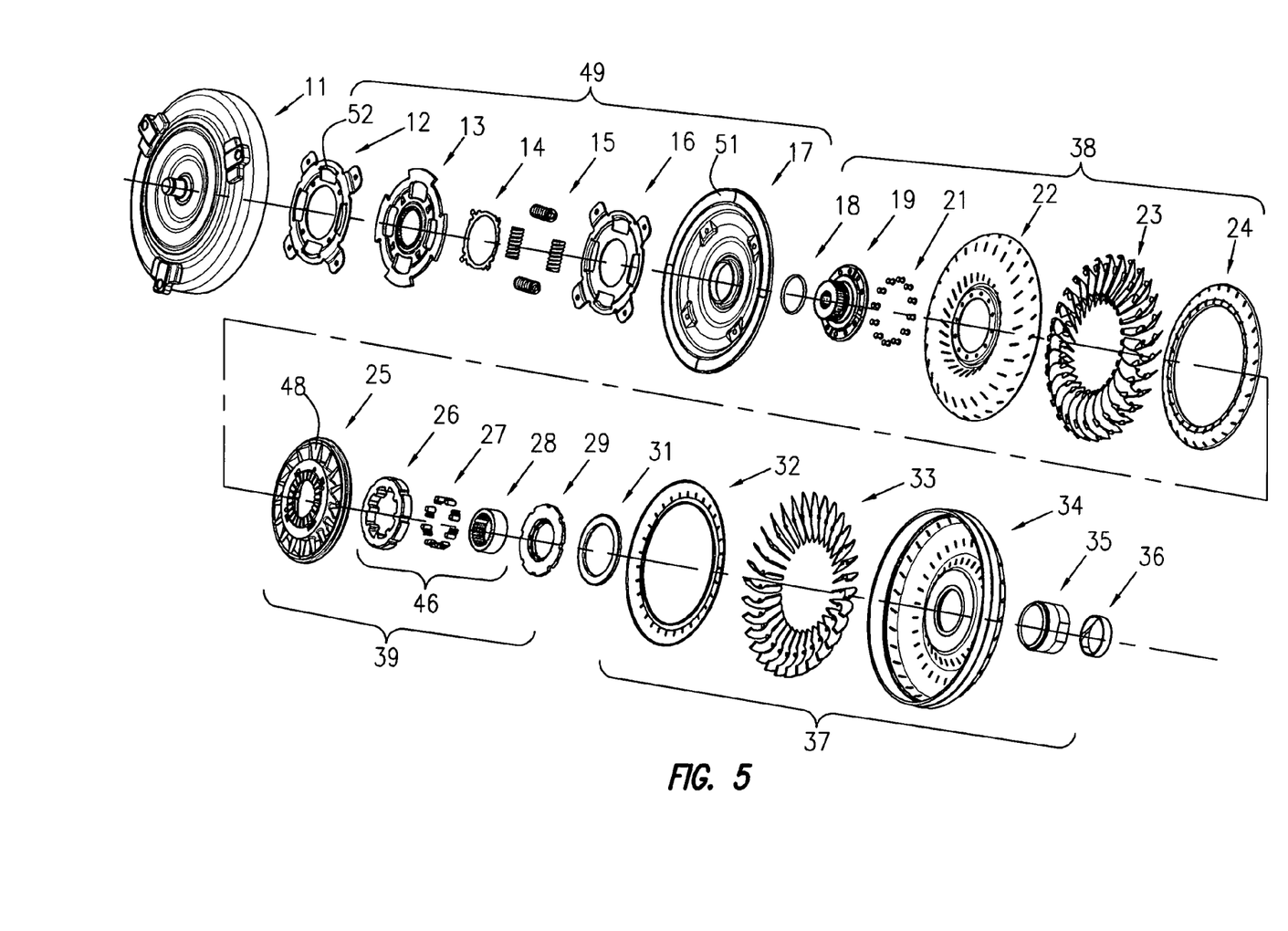
FIG. 5 is a first exploded view of the torque converter shown in FIG. 2, as shown from the perspective of one viewing the exploded torque converter from the left.
Figure 6:
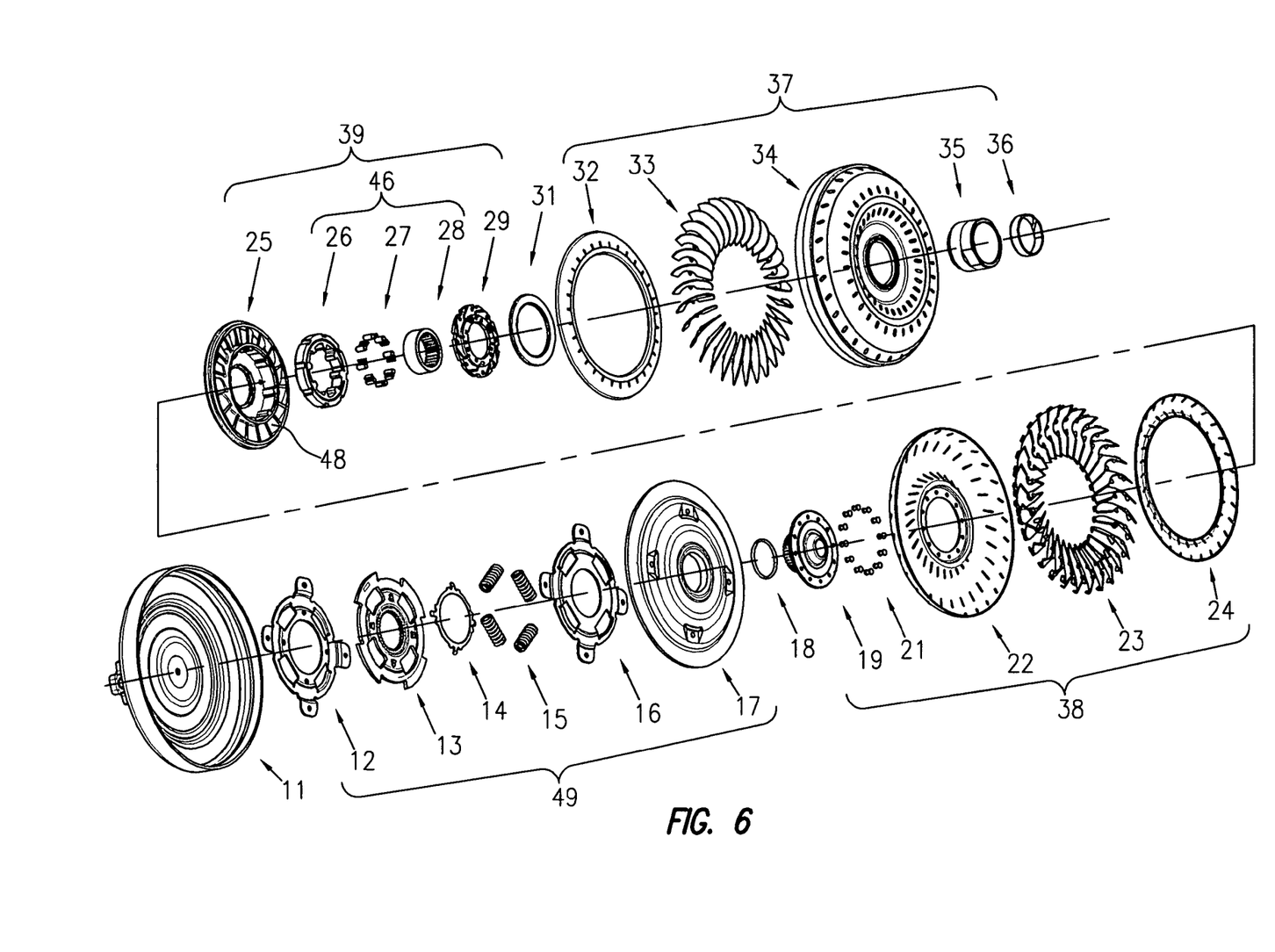
FIG. 6 is a second exploded view of the torque converter shown in FIG. 2, as shown from the perspective of one viewing the exploded torque converter from the right.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It is known to weld components in a torque converter using metal-inert gas (MIG) welding, also known as gas-metal-arc welding (GMAW). Unfortunately, MIG welding requires the use of filler material, adding to the complexity of the welding process and increasing the cost of the torque converter. Also, the use of filler material causes spatter, and subsequent contamination, in the torque converter. Further, it can be difficult to form a liquid-tight seal with MIG welding because of a "lack of fusion," due to the energy source and filler material being the same entity. Thus, there is a long-felt need for reducing the complexity, cost, and contamination associated with welding parts in a torque converter.

BRIEF SUMMARY OF THE INVENTION

The present invention broadly comprises a method for welding components in a torque converter, including: overlapping first and second edge portions of first and second components in the torque converter, respectively; tapering the first edge portion toward an edge for the first component; applying energy to the first edge portion; and melting, in the absence of a filler material, at least a portion of the first edge portion to form a weld between the first and second edge portions.

In some aspects: the first component includes a thickness and tapering the first edge portion includes reducing the thickness by approximately one half at the edge; or tapering the first edge portion includes forming a radius in the first edge portion. In some aspects: the first component includes a thickness and forming a radius in the first surface includes forming a radius approximately equal to one half the thickness; or the first component includes a thickness and tapering the first edge portion includes linearly reducing the thickness.

In some aspects, applying energy includes applying energy at an angle of approximately 45° with respect to the second edge portion. In some aspects, the first component includes a thickness and applying energy includes applying the energy at a point disposed from the edge at a distance approximately equal to 0.3 the thickness. In some aspects, melting at least a portion of the first edge portion to weld the first and second edge portions includes forming a liquid-tight seal between the first and second components or forming a chamfer in the first edge portion.

In some aspects, the first component includes a thickness and overlapping a first edge portion of a first component with a second edge portion of a second component includes overlapping by an amount approximately equal to the thickness. In some aspects, the first component includes a thickness and the method includes separating the first and second edge portions by an amount approximately equal to one quarter of the thickness. In some aspects, the first component includes a thickness and the first edge portion includes a length approximately equal to the thickness. In some aspects, the first component includes a thickness and tapering the first edge portion includes progressively reducing the thickness in a first portion of the first edge portion and maintaining a uniform thickness, less than the thickness, for a second portion of the first edge portion.

In some aspects, the torque converter includes a cover and a pump and the first component is one of the cover or the pump and the second component is the other of the cover or the pump.

The present invention also broadly comprises a torque converter, including: first and second overlapping edge portions of first and second components in the torque converter, respectively; and an autogenous weld, formed from the first edge portion and in the absence of a filler material, connecting the first and second components. In some aspects, the weld is a liquid-tight seal between the first and second components or the weld is a chamfer in the first component. In some aspects, the first component includes a thickness and the first and second components are separated, at the overlap, by an amount approximately equal to one quarter of the thickness, or the first component includes a thickness and the weld includes a length approximately equal to the thickness. In some aspects, the torque converter includes a cover and a pump and the first component is one of the cover or the pump and the second component is the other of the cover or the pump.

The present invention further broadly comprises a method for welding components in a torque converter, including: overlapping first and second edge portions of a cover and a pump, respectively; forming a radius in the first edge portion, the radius tapering toward an edge for the first component; applying energy, in the absence of a filler material, to the first edge portion; and melting the first edge portion to weld the first and second components, the weld having a chamfer shape.

It is a general object of the present invention to provide a method of reducing cost, complexity, and contamination associated with welding components in a torque converter.

It is a further object of the present invention to provide a method of welding components in a torque converter without the use of a filler material.

It is another object of the present invention to provide a method of welding a liquid-tight seam between components in a torque converter.

It is yet another object of the present invention to provide a torque converter with a cover and pump welded together without the use of filler material.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7:
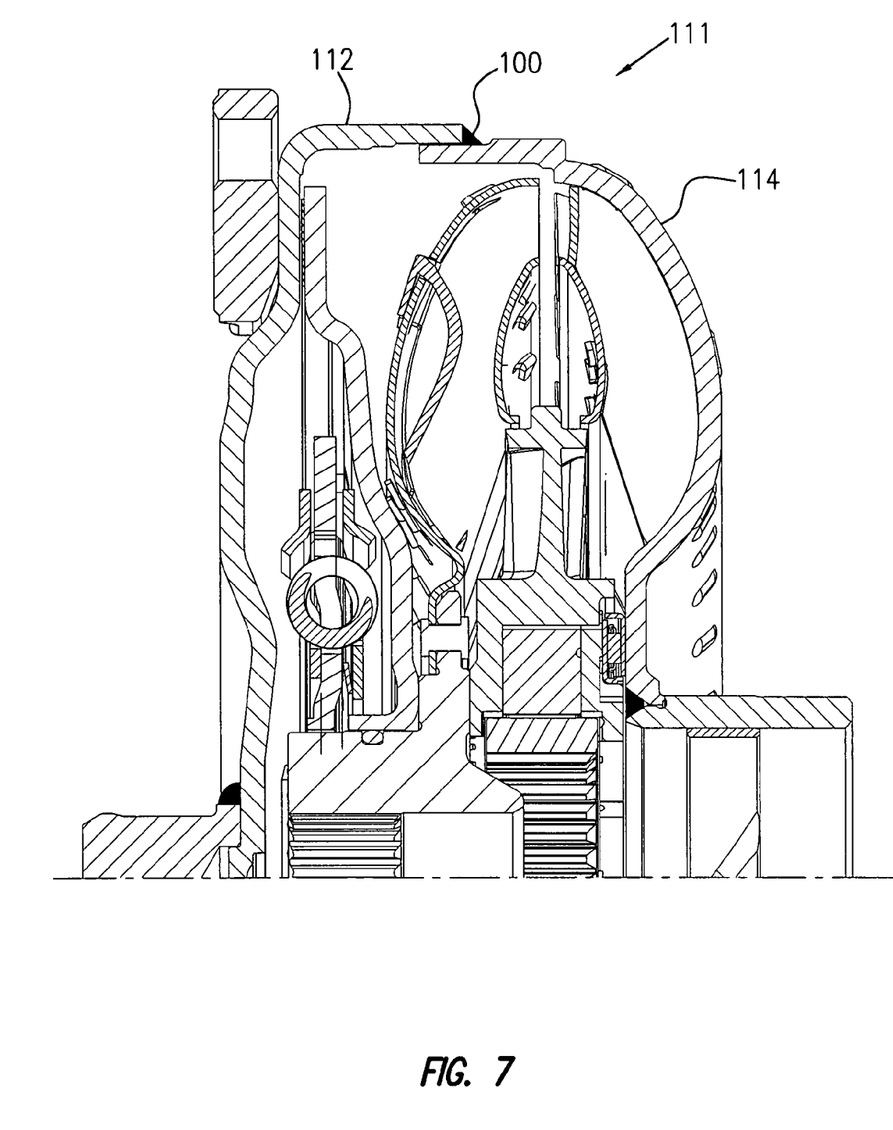
FIG. 7 is a partial cross-sectional view of a torque converter with a present invention welded seam between components.

FIG. 7 is a partial cross-sectional of a torque converter with present invention welded seam 100 between components.

Figure 8:
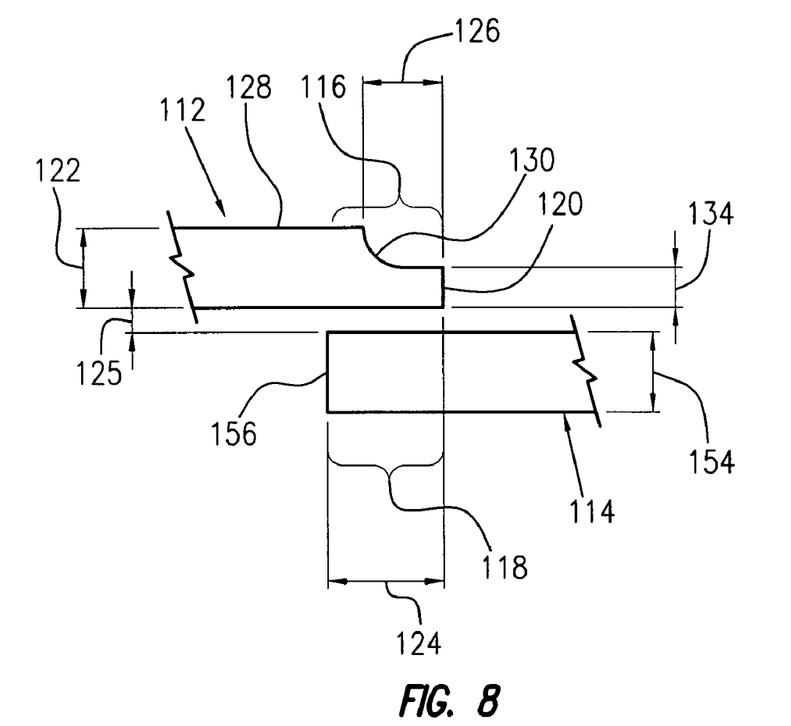
FIG. 8 is a partial cross-sectional view showing components for the torque converter in FIG. 7 prior to present invention welding.

FIG. 8 is a partial cross-sectional view showing components for the torque converter in FIG. 7 prior to present invention welding.

Figure 9:
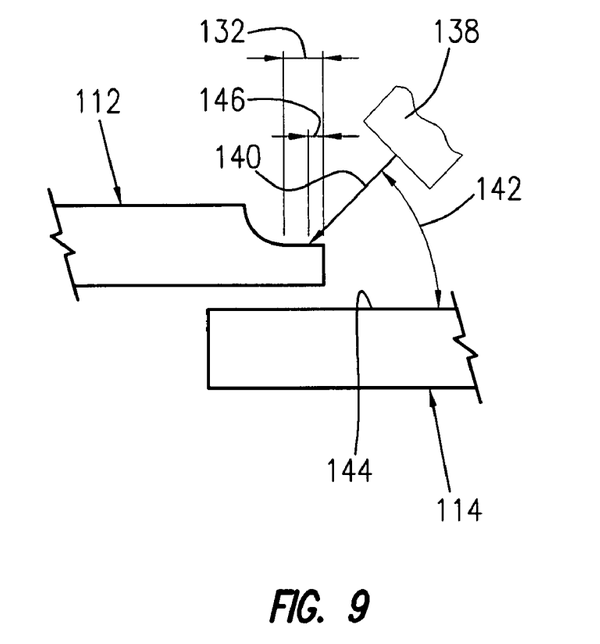
FIG. 9 is the partial cross-sectional view of FIG. 8 showing additional detail.

FIG. 9 is the partial cross-sectional view of FIG. 8 showing additional detail. The following should be viewed in light of FIGS. 7 through 9. FIGS. 8 through 9 show a process of forming a present invention weld, for example, weld 100 shown in FIG. 7. Torque converter 111 includes components 112 and 114. In some aspects, component 112 is one of a cover for the torque converter or a pump for the torque converter and component 114 is the other of the cover or pump. In FIG. 7, component 112 is the torque converter cover and component 114 is the pump shell. However, it should be understood that in some aspects (not shown), the configuration is reversed and the shell overlaps an outer circumference of the cover, that is, the shell is located radially outside of the cover. It also should be understood that a present invention method of autogenously welding components can be applied to other components in a torque converter. It should be further understood that a torque converter can include a present invention weld between other components.

Component 112 includes edge portion 116, which overlaps edge portion 118 of component 114. In general, portion 116 is tapered to, or toward, edge 120 to reduce thickness 122 of edge portion 112. In general, the thinning or tapering of portion 116 is done to facilitate a present invention welding process. In FIGS. 7 through 9, the thickness of the component that overlaps the other component is reduced. However, in some aspects (not shown), the thickness of the component that underlaps the other component, that is, the component that is located radially inside of the other component, is reduced. The discussion that follows is with respect to a present invention welded seam, however, it should be understood that a present invention welded seam is not limited to the configurations, proportions, orientation, and shapes shown and that other configurations, proportions, orientation, and shapes are within the spirit and scope of the claimed invention.

Components 112 and 114 overlap by amount 124. In some aspects, the minimum value for amount 124 is equal to thickness 122. Components 112 and 114 are separated by distance 125. In some aspects, distance 125 is limited to no more than approximately one quarter of thickness 122. Portion 116 has a length 126. In some aspects, length 126 is equal to thickness 122. Component 112 includes surface 128 facing away from component 114. In general, surface 128 is modified to produce the taper in portion 116. In some aspects, radius 130 is formed in surface 128 to produce the taper and the radius is equal to one half thickness 122. In some aspects, portion 116 includes a segment, or portion, in which the thickness of portion 116 is progressively reduced, for example, radius 130. Then, the remaining portion, or segment, of portion 116, for example, portion 132, is maintained at a uniform thickness, for example, thickness 134. Segment 132 substantially provides the stock material to be melted to form weld 100. In some aspects (not shown), thickness 122 is linearly, or uniformly, reduced in portion 116. That is, surface 128 forms a straight cross-sectional line in portion 116. In some aspects, portion 116 has a thickness 134 at end 120 equal to approximately one half thickness 122.

Energy source 138 applies energy to edge portion 116 along focal point, or line, 140. As shown in FIGS. 8 and 9, filler material, such as would be needed for a metal-inert gas welding process, is not used to form weld 100. That is, weld 100 is formed in the absence of a filler material. In some aspects, angle 142 between line 140 and component 114, in particular surface 144, a surface facing component 112, is approximately 45°. In some aspects, line 140 is applied at a distance 146 from end 140 approximately equal to 0.3 thickness 122. In some aspects, energy source 138 is a plasma welder. However, it should be understood that the present invention is not limited to a plasma welder and that other energy sources, including but not limited to a laser welder or Gas Tungsten Arc Welding (GTAW)/(TIG) welder, can be used.

Figure 10:
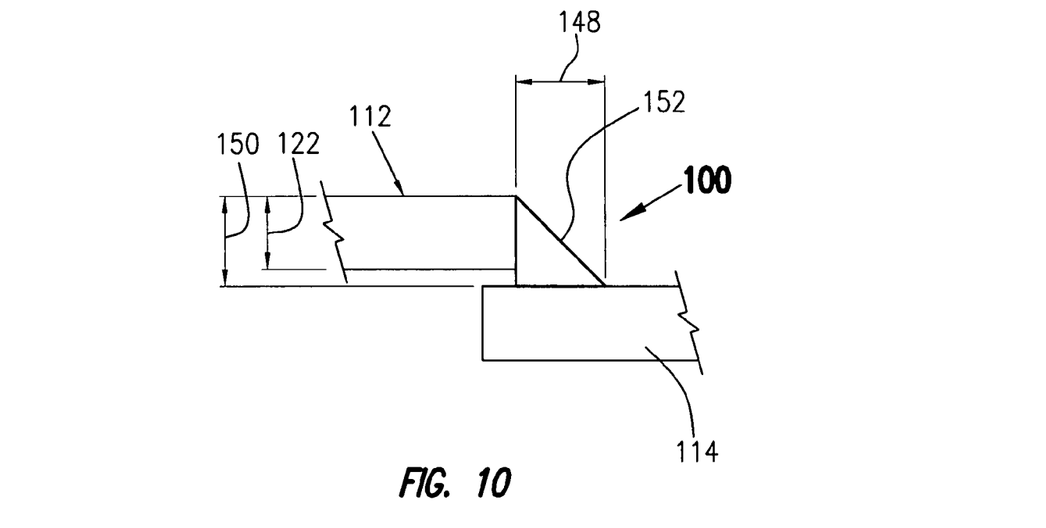
FIG. 10 is the partial cross-sectional view of FIG. 8 with the weld completed; and, FIG. 11 is a flow chart illustrating a present invention method for welding components in a torque converter.

FIG. 10 is the partial cross-sectional view of FIG. 8 with weld 100 completed. Energy source 138 has melted at least a portion of edge portion 116 to form weld 100, which welds, or fixedly connects, components 112 and 114. The following should be viewed in light of FIGS. 7 through 10. In some aspects, weld, or weld leg, 100 has length 148 approximately equal to thickness 122 and thickness 150 equal to thickness 122 plus gap 125, in this case, approximately equal to 1.25 thickness 122. Weld 100 forms a liquid-tight seal between components 112 and 114. In some aspects, weld 10 forms chamfer 152 in edge portion 116.

Component 112, in particular, portion 116, is operated upon and melted to form weld 100 between components 112 and 114 without the use of filler material. That is, portion 116 flows and changes state and shape to form a weld with component 114. In general, component 112 is manipulated, as described above, to enable the formation of weld 100. For example, thickness 154 of component 114, in particular at end 156, does not need to be altered. It should be understood that in some aspects (not shown), thickness 154 or end 156 are altered. In some aspects, since component 112 and portion 116 are operated upon to create weld 100, the non-limiting dimensions and proportions cited above for purposes of illustration are correlated with component 112 dimensions, in particular thickness 122.

The amount of material in portion 116 can be varied, for example, by varying radius 130 or thickness 122, to vary the size of weld 100. However, the speed of the welding process may require corresponding adjustment.

Figure 11:
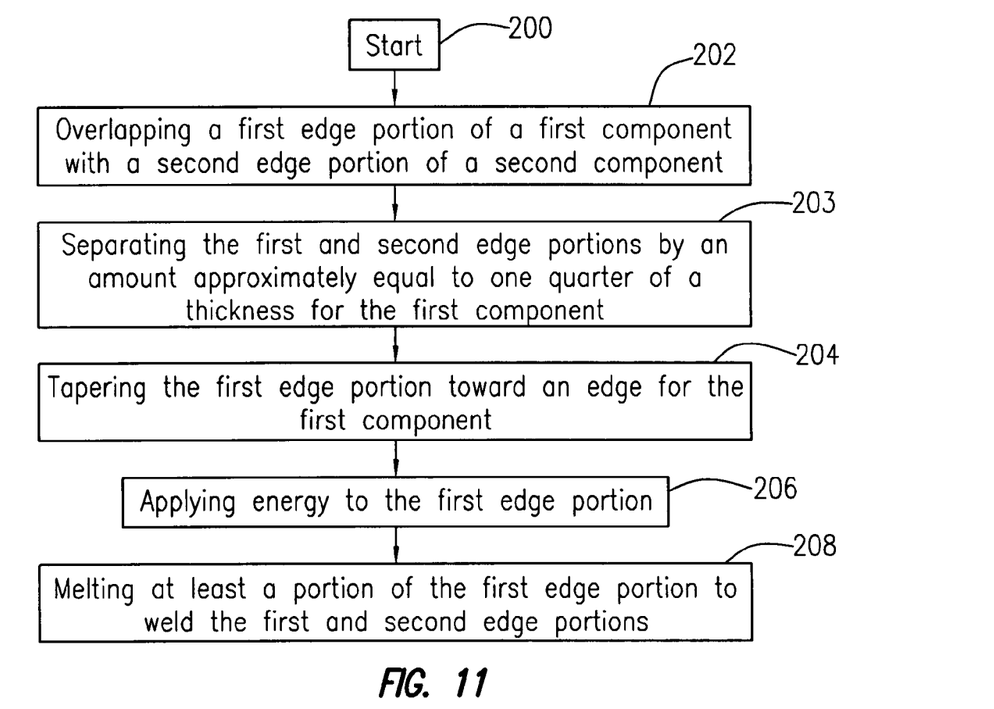

FIG. 11 is a flow chart illustrating a present invention method for welding components in a torque converter. Although the method in FIG. 11 is depicted as a sequence of numbered steps for clarity, no order should be inferred from the numbering unless explicitly stated. The method starts at Step 200. Step 202 overlaps first and second edge portions of first and second components in the torque converter, respectively. Step 204 tapers the first edge portion toward an edge for the first component. Step 206 applies energy, in the absence of a filler material, to the first edge portion. Step 208 melts at least a portion of the first edge portion to weld the first and second components.

In some aspects: the first component includes a thickness and Step 204 includes reducing the thickness by approximately one half at the edge; or the first edge portion includes a surface facing away from the second edge portion and Step 204 includes forming a radius in the surface facing away from the second edge portion. In some aspects, the first component includes a thickness and forming a radius in the first surface includes forming a radius approximately equal to one half the thickness. In some aspects, the first component includes a thickness and Step 204 includes linearly reducing the thickness.

In some aspects, the second edge portion includes a surface facing the first edge portion and Step 206 includes applying energy at an angle with respect to the surface facing the first edge portion. In some aspects, the first component includes a thickness and Step 206 includes applying energy at a point disposed from the edge at a distance approximately equal to 0.3 the thickness. In some aspects, Step 206 includes forming a liquid-tight seal between the first and second components or forming a chamfer in the first edge portion.

In some aspects, the first component includes a thickness and Step 202 includes overlapping by an amount approximately equal to the thickness. In some aspects, the first component includes a thickness and Step 203 separates the first and second edge portions by an amount approximately equal to one quarter of the thickness. In some aspects, the first component includes a thickness and the first edge portion includes a length approximately equal to the thickness. In some aspects, the first component includes a thickness and Step 204 progressively reduces the thickness in a first portion of the first edge portion and maintains a uniform thickness, less than the thickness of the first portion, for a second portion of the first edge portion.

In some aspects, the torque converter includes a cover and a pump and the first component is one of the cover or pump and the second component is the other of the cover or pump.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A method for welding components in a torque converter, comprising:
   overlapping first and second edge portions of first and second components in said torque converter, respectively;
   tapering said first edge portion toward an edge for said first component;
   applying energy to said first edge portion, in the absence of a filler material; and,
   melting said first edge portion to form a weld between said first and second components, wherein tapering said first edge portion further comprises forming a radius in said first edge portion.

2. The method of claim 1 wherein said first component further comprises a thickness and tapering said first edge portion further comprises reducing said thickness by approximately one half at said edge.

3. The method of claim 1 wherein said first component further comprises a thickness and wherein forming a radius in said first edge portion further comprises forming a radius approximately equal to one half said thickness.

4. The method of claim 1 wherein said first component further comprises a thickness and wherein tapering said first edge portion further comprises linearly reducing at least a portion of said first edge portion equal to about one half of said thickness.

5. The method of claim 1 wherein applying energy further comprises applying energy at an angle of approximately 45° with respect to said second edge portion.

6. The method of claim 1 wherein said first component further comprises a thickness and wherein applying energy further comprises applying said energy at a point disposed from said edge at a distance approximately equal to 0.3 said thickness.

7. The method of claim 1 wherein melting said first edge portion to form a weld further comprises forming a liquid-tight seal between said first and second components.

8. The method of claim 1 wherein melting said first edge portion to form a weld further comprises forming said weld in the shape of a chamfer.

9. The method of claim 1 wherein said first component further comprises a thickness and wherein overlapping first and second edge portions of first and second components, respectively further comprises overlapping by an amount approximately equal to said thickness.

10. The method of claim 1 wherein said first component further comprises a thickness and said method further comprising separating said first and second edge portions by an amount approximately equal to one quarter of said thickness.

11. The method of claim 1 wherein said first component further comprises a thickness and said first edge portion further comprises a length approximately equal to said thickness.

12. The method of claim 1 wherein said torque converter further comprises a cover and a pump and wherein said first component is one of said cover and said pump and said second component is the other of said cover and said pump.

13. The method of claim 1 wherein said torque converter further comprises a cover and a pump, said first component is said cover, and said second component is said pump.

14. The method of claim 1 wherein said first component further comprises a thickness and wherein tapering said first edge portion toward an edge for said first component further comprises progressively reducing said thickness in a first portion of said first edge portion and maintaining a uniform thickness, less than said thickness, for a second portion of said first edge portion.

15. A torque converter, comprising:
   first and second overlapping edge portions of first and second components in said torque converter, respectively; and,
   an autogenous weld, formed from said first edge portion and in the absence of a filler material, connecting said first and second components, wherein said weld comprises a chamfer in said first component.

16. The torque converter of claim 15 wherein said weld comprises a liquid-tight seal between said first and second components.

17. The torque converter of claim 15 wherein said first component further comprises a thickness and said first and second components are separated, at said overlap, by an amount approximately equal to one quarter of said thickness.

18. The torque converter of claim 15 wherein said first component further comprises a thickness and said weld further comprises a length approximately equal to said thickness.

19. The torque converter of claim 15 further comprising a cover and a pump and wherein said first component is one of said cover and said pump and said second component is the other of said cover and first pump.

20. The torque converter of claim 15 further comprising a cover and a pump and wherein said first component is said cover, and said second component is said pump.

21. A method for welding components in a torque converter, comprising:
   overlapping first and second edge portions of a cover and a pump, respectively;
   forming a radius in said first edge portion, said radius tapering toward an edge for said first component;
   applying energy to said first edge portion, in the absence of a filler material; and,
   melting said first edge portion to weld said first and second components together.

\* \* \* \* \*